No. 793,438. PATENTED JUNE 27, 1905.
H. F. HALL.
EGG BOILER.
APPLICATION FILED OCT. 11, 1904.

WITNESSES:
H. B. Hallock.
L. H. Morrison

INVENTOR
Harry F. Hall
BY
ATTORNEY.

No. 793,438.                                    Patented June 27, 1905.

UNITED STATES PATENT OFFICE.

HARRY F. HALL, OF PHILADELPHIA, PENNSYLVANIA.

EGG-BOILER.

SPECIFICATION forming part of Letters Patent No. 793,438, dated June 27, 1905.

Application filed October 11, 1904. Serial No. 227,991.

*To all whom it may concern:*

Be it known that I, HARRY F. HALL, a citizen of the United States, residing at Philadelphia, county of Philadelphia, and State of Pennsylvania, have invented a certain new and useful Improvement in Egg-Boilers, of which the following is a specification.

My invention relates to a new and useful improvement in egg-boilers, and has for its object to provide a device for boiling eggs and automatically timing the same.

With this end in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1:
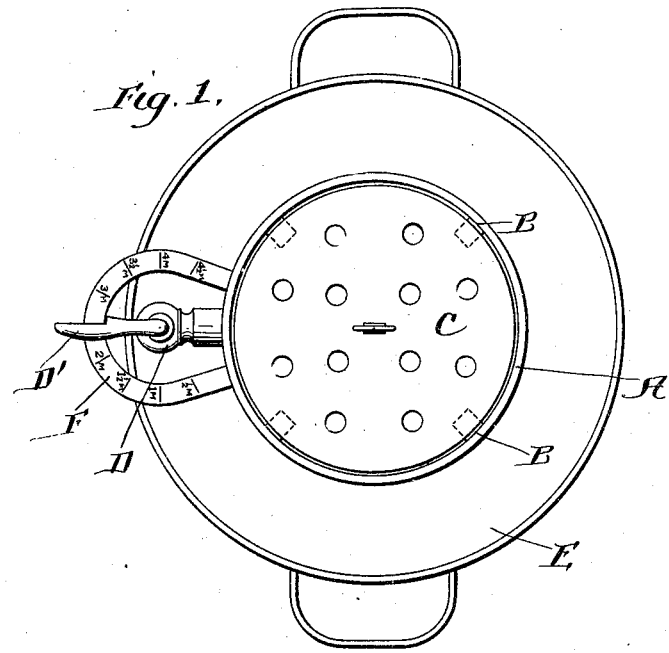
Figure 2:
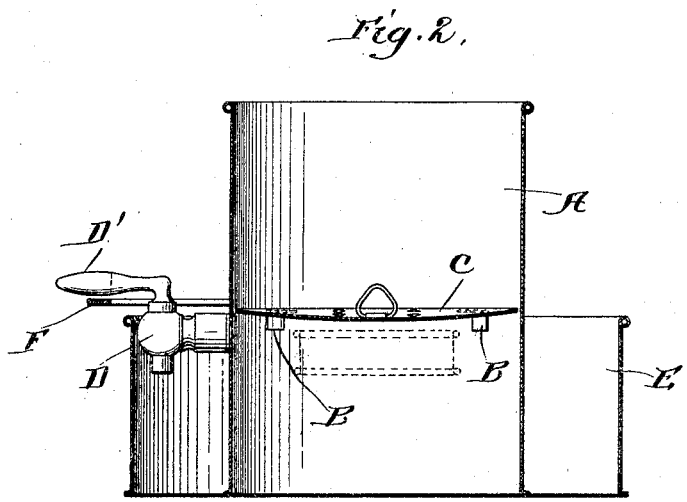

Figure 1 is a plan view of my improved boiler; Fig. 2, a vertical section through the same.

A represents the boiler, adapted to be placed upon the stove and to contain the boiling water. Part way down in this boiler are arranged clips B, upon which is adapted to rest the removable perforated disk C.

D is a drain-cock leading from the receptacle A at a point below the disk C.

E is a receptacle secured to the receptacle A, on the outside of the same, in which the water flowing from the cock D is adapted to pass.

In operation the receptacle A is filled with boiling water, and the eggs are placed upon the disk C. The valve of the drain-cock is then set so that the water above the disk will run out of the cock into the receptacle E in a certain specified time, thus arresting the boiling of the eggs.

Any form of dial may be used to show at what point to place the handle of the valve to allow the water to drain off in a predetermined time. The dial shown in the drawings consists of a strip F in the form of a horseshoe, each end being secured to the outside of the receptacle A and extending around the cock concentric with the pivotal point of the valve. This dial is marked with graduations, and the cock is so constructed that when the handle of the valve is to its limit on one side it will be closed off and when it is to its limit on the other side it will be opened to its fullest extent.

In operation if it is desired to boil eggs, say, two and one-half minutes, the receptacle A is filled with boiling water, the eggs are placed upon the disk C, and the handle D' of the valve turned until it is opposite to "$2\frac{1}{2}$" mark upon the disk F, as shown in Fig. 1. Then the water above the disk C will be drawn out in just two and one-half minutes, and the eggs may be removed at any time desired.

Of course this device can be made in any size desired, either for household use or for use at hotels, restaurants, &c., and I do not wish to be limited to the exact construction here shown, as slight modifications could be made without departing from the spirit of my invention.

Having thus fully described my invention, what I claim as new and useful is—

1. In a device of the character described, a receptacle open at its upper end adapted to rest upon the stove, a removable perforated disk suspended part way down in the receptacle, a drain-cock leading from the receptacle below the disk, a drain-receptacle arranged outside of the first-named receptacle in which the water from the cock is adapted to flow, and a dial marked with graduations arranged in juxtaposition to the handle of the cock, as and for the purpose specified.

2. In a device of the character described, a boiler adapted to rest upon the stove, brackets extending inward from the walls of the boiler at a point intermediate between the top and bottom of the same, a removable perforated disk adapted to rest upon said brackets, a drain-cock leading from the boiler at a point below the disk, a receptacle surrounding the lower end of the boiler in which the water from the drain-cock is adapted to flow, a dial surrounding the drain-cock concentric with the valve thereof, said dial marked with graduations to determine the position at which the handle of the valve shall be set to drain the water from the boiler above the disk in a predetermined length of time, as and for the purpose specified.

In testimony whereof I have hereunto affixed my signature in the presence of two subscribing witnesses.

HARRY F. HALL.

Witnesses:
　MARY E. HAMER,
　L. W. MORRISON.